United States Patent [19]

Newman

[11] Patent Number: 5,259,854
[45] Date of Patent: Nov. 9, 1993

[54] DISPOSABLE HEPA FILTRATION DEVICE

[75] Inventor: Eugene E. Newman, Palm City, Fla.

[73] Assignee: GPAC, Inc., Palm City, Fla.

[21] Appl. No.: 996,169

[22] Filed: Dec. 23, 1992

[51] Int. Cl.⁵ ............................................. B01D 46/02
[52] U.S. Cl. ......................................... 55/320; 55/429;
   55/472; 55/498; 55/500; 55/DIG. 3; 251/65
[58] Field of Search ...................... 55/318, 320, 365.2,
   55/429, 471, 472, 493, 497, 498, 500, 508, 521,
   DIG. 3; 137/856, 855; 251/65

[56] References Cited

U.S. PATENT DOCUMENTS

| | | |
|---|---|---|
| 1,704,241 | 3/1929 | Brown . |
| 2,034,373 | 3/1936 | Bilde . |
| 3,032,954 | 5/1962 | Racklyeft . |
| 3,103,426 | 9/1963 | Lantz, Jr. . |
| 3,180,071 | 4/1965 | Nolte . |
| 3,508,383 | 4/1970 | Humbert, Jr. . |
| 3,541,945 | 11/1970 | Wexler ............................... 251/65 X |
| 3,605,786 | 9/1971 | Machin, Jr. . |
| 3,616,624 | 11/1971 | Marsh . |
| 3,775,951 | 12/1973 | Eicholz et al. . |
| 3,891,000 | 6/1975 | Melnick ............................... 251/65 X |
| 3,921,250 | 11/1975 | Jerabek . |
| 3,928,008 | 12/1975 | Petersen . |
| 4,059,409 | 11/1977 | Barto et al. . |
| 4,061,480 | 12/1977 | Frye et al. . |
| 4,072,483 | 2/1978 | Doyle, Jr. . |
| 4,118,208 | 10/1978 | Klinedinst . |
| 4,175,934 | 11/1979 | Lang et al. . |
| 4,187,182 | 2/1980 | Rosenberg . |
| 4,229,193 | 10/1980 | Miller . |
| 4,278,454 | 7/1981 | Nemesi . |
| 4,294,595 | 10/1981 | Bowerman . |
| 4,333,745 | 6/1982 | Zeanwick . |
| 4,334,900 | 6/1982 | Neumann . |
| 4,486,206 | 12/1984 | Miyakawa et al. . |
| 4,543,112 | 9/1985 | Ackley et al. . |
| 4,559,067 | 12/1985 | Durston . |
| 4,613,348 | 9/1986 | Natale . |
| 4,726,825 | 2/1988 | Natale . |
| 5,040,002 | 8/1991 | Pollacek et al. ................... 251/65 X |

FOREIGN PATENT DOCUMENTS

| | | |
|---|---|---|
| 2643067 | 3/1978 | Fed. Rep. of Germany . |
| 2040722 | 9/1980 | United Kingdom . |
| 2070965 | 9/1981 | United Kingdom . |
| 2147799 | 5/1985 | United Kingdom . |
| 2171614 | 9/1986 | United Kingdom . |

Primary Examiner—Charles Hart
Attorney, Agent, or Firm—Jacobson, Price, Holman & Stern

[57] ABSTRACT

A disposable canister containing a HEPA filtration mechanism is used in conjunction with a removably mounted vacuum motor assembly. The vacuum motor assembly draws particulate-laden air, including harmful airborne contaminants, into an inlet opening of the canister by a disposable vacuum hose. The inlet opening is made of a magnetically attracting material. The particulate-laden air is then filtered through the HEPA filtration mechanism prior to exiting from the canister as non-contaminated air. Upon termination of the vacuum force on the inlet, a hinged magnetic flap seals the inlet to the canister. The immediate and complete sealing of the inlet by the magnetically biased flap assures against escape of harmful contaminants from the canister.

35 Claims, 5 Drawing Sheets

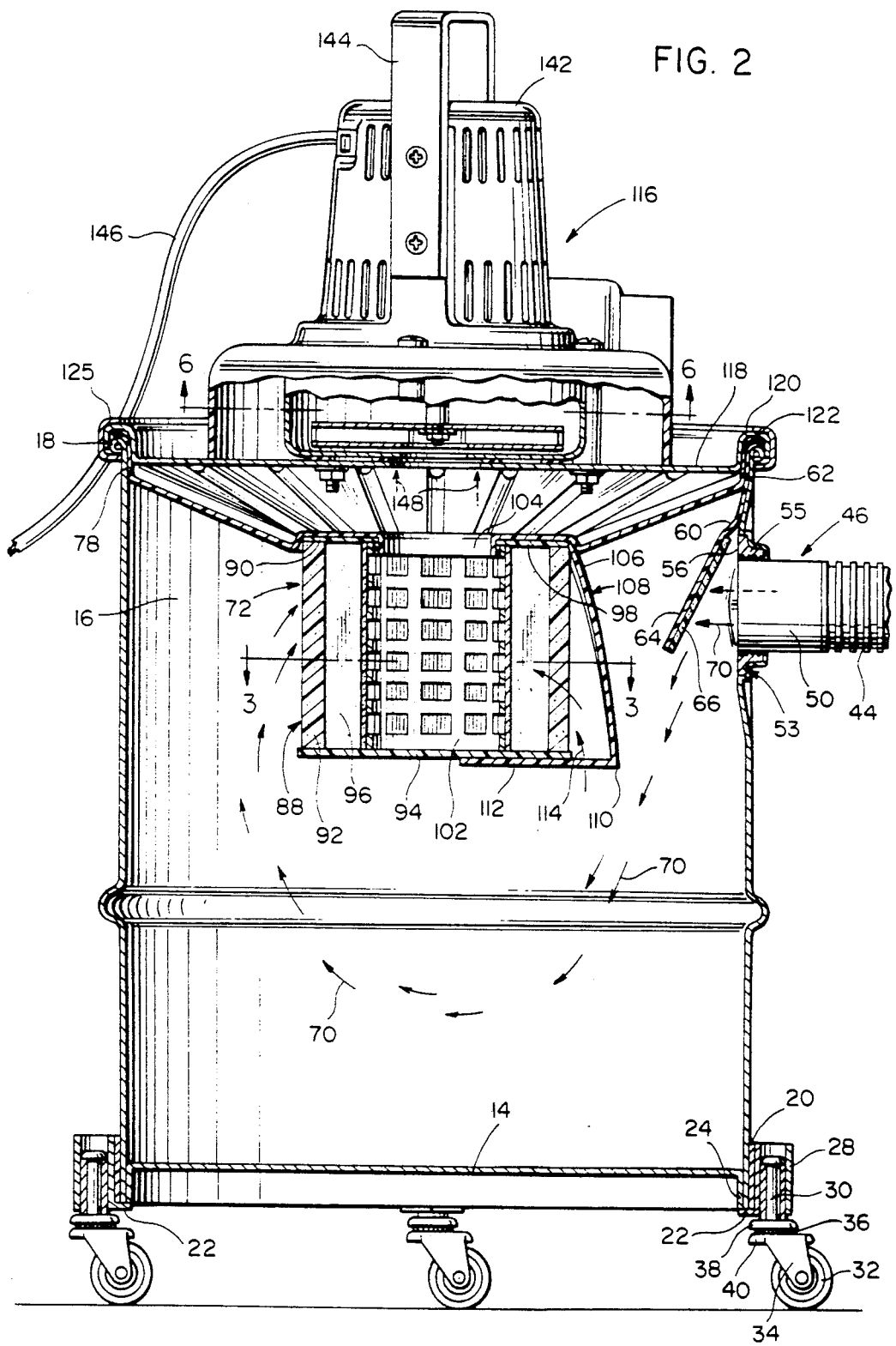

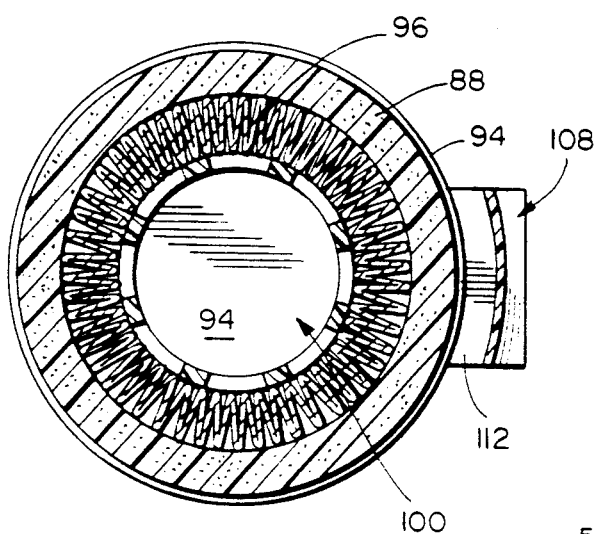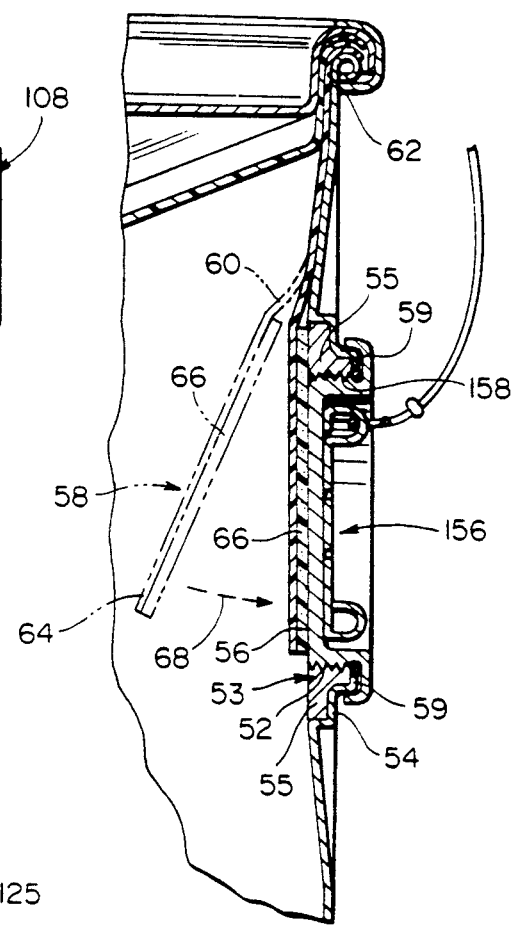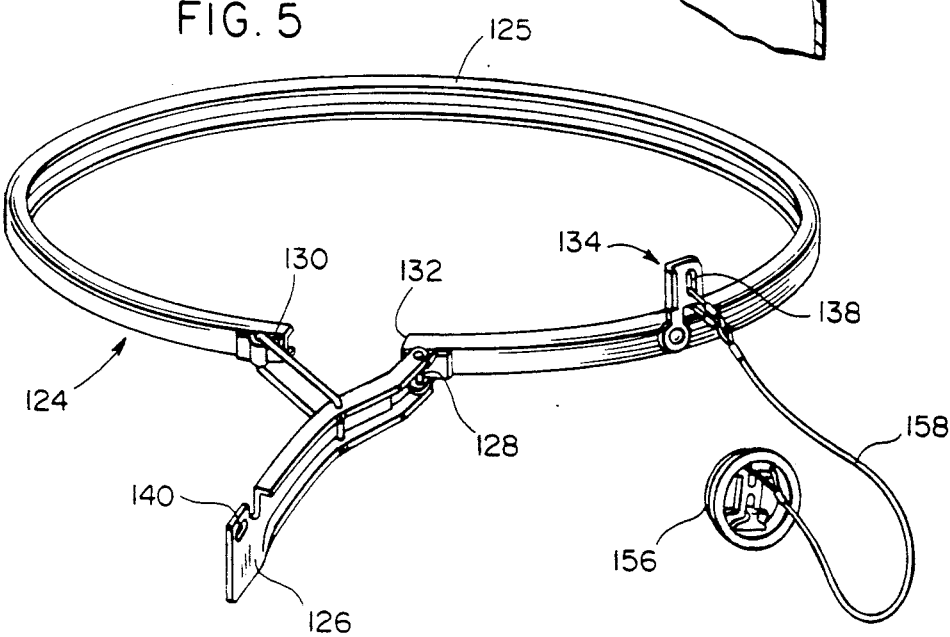

DISPOSABLE HEPA FILTRATION DEVICE

FIELD OF THE INVENTION

The present invention relates to the collection of harmful contaminants in a vacuum powered disposable canister and sealing the collected contaminants in the disposable canister.

BACKGROUND OF THE INVENTION

There is an increasing public awareness of the presence of potentially harmful materials of a microscopic size. These materials may include, for example, lead dust generated by the deterioration of lead paint, asbestos fibers which can become airborne if disturbed, biohazards which can be produced during medical treatment of infectious disease patients and allergenic debris caused by organic dusts, pollens and microscopic biological materials (such as dust mites).

During the last 18 months there have been a number of dramatic developments relating to lead. The U.S. Environmental Protection Agency (EPA) has announced that lead poisoning is the single greatest environmental health threat faced by children in America. In addition, the Center for Disease Control in Atlanta, Ga., recently issued a national health bulletin reducing the levels of lead in the blood considered to officially constitute "poisoning." The new levels are 1/10the of the old standards. New medical data indicates that neurological damage (particularly in children) can be caused by much smaller amounts of lead in the blood than was previously known.

The EPA and other health authorities have determined that the most common source of lead ingestion in children is dust. The widely publicized lead paint "chips" which are eaten by children are usually only found in seriously deteriorating structures. Lead paint dust, on the other hand, is found everywhere there is lead paint because lead paint naturally forms a light surface patina of lead-containing dust as it ages. This dust sluffs off and falls onto rugs, furniture and other surfaces. Lead dust hazards are increased by normal home renovation and maintenance activities which disturb lead-contaminating dust.

With respect to asbestos contaminated particulate, this particulate is primarily produced from asbestos used as a heat insulating, fireproof material. Asbestos use was extensive in all fields of construction prior to the recent concern about the health hazards involved with the use of asbestos. With the recent public awareness of the detrimental effects of the exposure to asbestos found in airborne dust and the like, many clean-up campaigns have been undertaken to eliminate asbestos and asbestos-containing dust from public places. Asbestos-containing dust has therefore now also become a major health concern.

Asbestos-containing particles and dust are generated during the removal of asbestos, routine building renovations and building maintenance. In addition, asbestos-containing materials have been found to regularly sluff off from pipe and boiler covering materials, ceiling coverings, and insulation during normal wear and tear of the asbestos-containing insulation and materials. Particular attention has now been given to this problem in schools and other public buildings where accumulations of asbestos-containing dust is commonly found in corridors, rooms and maintenance areas.

The clean up of asbestos-containing dust as well as other harmful contaminants, is a problem unto itself. The fine asbestos particles found in asbestos-containing dust present asbestos in its most dangerous form. Asbestos fibers in dust easily take flight on air currents and can readily circulate throughout an entire air circulation system of a building. The levels of contamination, though invisible to the human eye, are often as high as those levels of contamination which have been documented to cause significant percentages of cancer in exposed populations.

Present practice for the removal of asbestos-containing dust includes the use of industrial machines for the removal of toxic dust. These machines are large, heavy-duty vacuum cleaners, specially designed for this purpose. The vacuum cleaners are equipped with special internal HEPA filtration systems. They operate by placement of a vacuum cleaner hose adjacent to asbestos-containing dust and creating a vacuum to suck in dust through the hose. The air suction of the vacuum cleaner through the hose draws dust into the unit where large debris is trapped in coarse, disposable filter bags. Exhausted air is then forced through thick HEPA filtration material, which traps the sub-micron sized fibers. The air exiting the unit is clear of toxic material.

A serious unpublicized, but widely-recognized problem, associated with even sophisticated HEPA vacuum cleaners is that these machines must be emptied when they become full with asbestos-containing debris. The only method for emptying these machines is to open the machine, take out the bag of collected asbestos debris and dispose of the contaminated bag. This process creates substantial amounts of airborne contamination in the surrounding environment and is quite hazardous to an unprotected operator.

Another attempt to remove asbestos-containing dust includes the use of standard vacuum cleaners which are, in effect, asbestos recontamination machines since they contain no HEPA filter or other asbestos decontamination mechanism. Asbestos-containing dust is drawn into a non-HEPA filtered vacuum cleaner, trapping the debris in a disposable debris bag. The air exhausted from the machine is filled with asbestos fibers and is circulated into the surrounding environment by the force of the exhausted air.

U.S. Pat. No. 4,072,483 to Doyle, Jr., discloses a vacuum cleaner employing a plurality of filters for picking up asbestos fibers. When it is desired to dispose of the asbestos fibers, the cover of the vacuum cleaner is opened and the filters are manually pulled from the tank, exposing the operator to asbestos contamination.

U.S. Pat. No. 4,229,193 to Miller, discloses a filter bag for a vacuum cleaner. The filter bag includes a primary filter bag, an impermeable shield and a secondary filter as a single unit. The filters are encapsulated within the impermeable shield. The area of the impermeable shield, which surrounds the opening into the primary filter bag, has an opening therethrough which is aligned with and is the same size as an opening of a container through which a hose connection with the container is made. The opening communicates through the impermeable shield and through the inlet of the primary filter bag, into the interior of the filter bag. To dispose of the filter bag, the bag must be removed from the vacuum cleaner.

U.S. Pat. Nos. 4,613,348 and 4,726,825 to Natale disclose a plastic disposable canister containing a HEPA filtration mechanism. Once full with asbestos-containing dust, the entire canister including the HEPA filtration mechanism is disposed of following proper disposal procedures for asbestos.

A problem, not specifically addressed by the prior art practices, is the increasingly stringent guidelines governing the collection and removal of lead-contaminated particulate during demolition, renovation, and normal wear and tear. It has been determined that the fine particles of lead, which can become airborne during renovation or demolition, pose a hazardous situation at least equally as dangerous to the public health as was determined to exist by exposure to asbestos-containing dust. No steps have presently been taken to address this potentially serious problem.

SUMMARY OF THE INVENTION

The present invention includes a disposable canister having a body made of metal, plastic or other suitable material, which contains a HEPA filtration mechanism. The canister is used in conjunction with a removably mounted vacuum motor assembly normally mounted atop the canister when in use. The vacuum motor assembly causes the harmful contaminants such as lead and/or asbestos-containing particles and dust, to be sucked into an inlet of the canister by a disposable plastic vacuum hose. The particulate-laden air sucked into the canister is then filtered through the HEPA filtration mechanism prior to exiting from the canister as non-contaminated air.

The inlet-opening is equipped with a bung-type fitting made of steel or other metal which is magnetically attracting. Whenever the suction force is stopped, a hinged magnetic flap is provided which unexpectedly causes a complete and tight sealing of the inlet to the canister. This immediate and complete sealing of the inlet by the magnetically biased flap ensures against any escape of airborne contaminants from within the canister.

A support or top plate containing an exhaust port for the filtered air extends across the top of the canister to seal the top of the canister and provides an air space above the support plate within which the vacuum motor can create the necessary suction on the filters and the hinged magnetic flap. The support plate is preferably conical in shape and includes a tapered peripheral edge which terminates in a curved lip. The curved lip engages a rim of the canister so that the tapered peripheral edge can secure the support plate in the canister by a suitable adhesive.

The exhaust port is preferably formed as a central opening in the support plate, through which filtered air is allowed to pass after passing through the HEPA filter mechanism. The support plate is located near the top of the canister to permit a substantial volume of the interior of the canister to be used for collection of harmful contaminants, while at the same time providing the necessary space for suction formation.

Air drawn into the canister through the inlet is continuously sucked toward the exhaust port by the removable vacuum motor assembly. To reach the exhaust port, the air is filtered through the HEPA filtration mechanism. The HEPA filtration mechanism includes preferably an annular HEPA filter provided with a radially outermost prefilter. The HEPA filter includes approximately one and one-half inches of HEPA filter material. The HEPA filter material removes particles of a size greater than 0.3 microns with an efficiency of 99.97%. The annular HEPA filter is preferably provided with a central cylindrical-shaped opening which is in communication with the exhaust port of the support plate. A circular plate extends across the bottom edge of the entire HEPA filtration mechanism.

Filtered air is drawn from the HEPA filter to the exhaust port of the support plate and into the vacuum motor assembly from which the filtered air is exhausted. The HEPA filter mechanism removes substantially all of the harmful contaminants from the airstream and retains them in the lower section of the canister.

Located diametrically across from the inlet to the canister, as part of the HEPA filter mechanism, and tapering outwardly from an upper edge of the prefilter, is a deflection plate. The deflection plate diverts the incoming airstream with airborne contaminants from immediately contacting the prefilter of the HEPA filter mechanism. This avoids an immediate clogging of the prefilter.

The inlet airstream, upon contacting the deflection plate, causes the airborne contaminants to be deflected into the interior of the canister so that the air may circulate within the canister causing heavier debris and dust to settle to the bottom of the canister. Finer sized contaminants contained in the air are filtered out of the air stream by the HEPA filter mechanism prior to passage to the exhaust port.

Once a total recommended amount of use of the HEPA filtration device is completed, the inlet is sealed with the threaded metal cap of the bung-type fitting. A sealing band which secures the vacuum motor assembly to the metal canister is unlocked, removed, and the vacuum motor assembly lifted from the top of the metal canister. A sealing plate is then placed on top of the canister so as to force the curved lip of the support plate between the sealing plate and the rim of the canister. The sealing band is then reapplied and locked around the top of the canister to secure the sealing plate in place.

The threaded metal cap is an added precaution to ensure that the harmful contaminants remain trapped in the canister during transport and disposal. The magnetic flap also seals against the threaded metal cap as well as the inlet to prevent escape of harmful contaminants from the interior of the canister.

All harmful contaminants, once in the canister, are always kept within the interior of the canister. The sealed canister is then disposed of in its entirety. The possibility of recontaminating the atmosphere or endangering the operator by exposure to harmful contaminants during disposal is thereby totally eliminated.

With respect to biological contaminants, fear of AIDS has affected virtually every aspect of hospital activities including the manner in which operating, therapeutic and general patient rooms are cleaned. Operating rooms where human biological material quickly accumulates on the floor are a particular concern. The present invention may be used by hospital maintenance personnel by injecting a standard biocide material into the canister, such as through the inlet, by incorporating a special ultraviolet light system in the canister during operation that kills microscopic organisms during or after collection to sanitize the collected particulate. The canister of this configuration would require enhanced sealing mechanisms in keeping with the requirements for bio-hazard containment.

It is a primary object of the present invention to provide an improved disposable device for collecting harmful contaminants which is safe, efficient and can be manufactured at a reasonable cost.

It is another primary object of the present invention to collect harmful contaminants within a disposable canister without exposing the operator to toxic materials during collection and disposal of the toxic materials.

It is yet another object of the present invention to seal toxic materials in a disposable canister during collection by sealing the inlet opening upon loss of suction with a new and unique sealing mechanism.

It is still another object of the present invention to provide a filtration canister, having an inlet and an exhaust port, which are always effectively sealed to prevent escape of harmful contaminants from the interior of the filtration canister.

These and other objects of the invention, as well as many of the intended advantages thereof, will become more readily apparent when reference is made to the following description of the preferred embodiments taken in conjunction with the accompanying drawings.

BRIEF DESCRIPTION OF THE DRAWINGS

FIG. 2 is a partial sectional view of the metal filtration canister and the vacuum motor assembly shown in FIG. 1.

FIG. 3 is a sectional view taken along line 3—3 of FIG. 1.

FIG. 4 is an enlarged sectional view of a preferred inlet to the filtration canister and magnetic seal flap for the inlet in accordance with the present invention.

FIG. 5 illustrates a sealing band for surrounding an uppermost edge of the filtration canister.

DETAILED DESCRIPTION OF THE PREFERRED EMBODIMENTS

Figure 1:
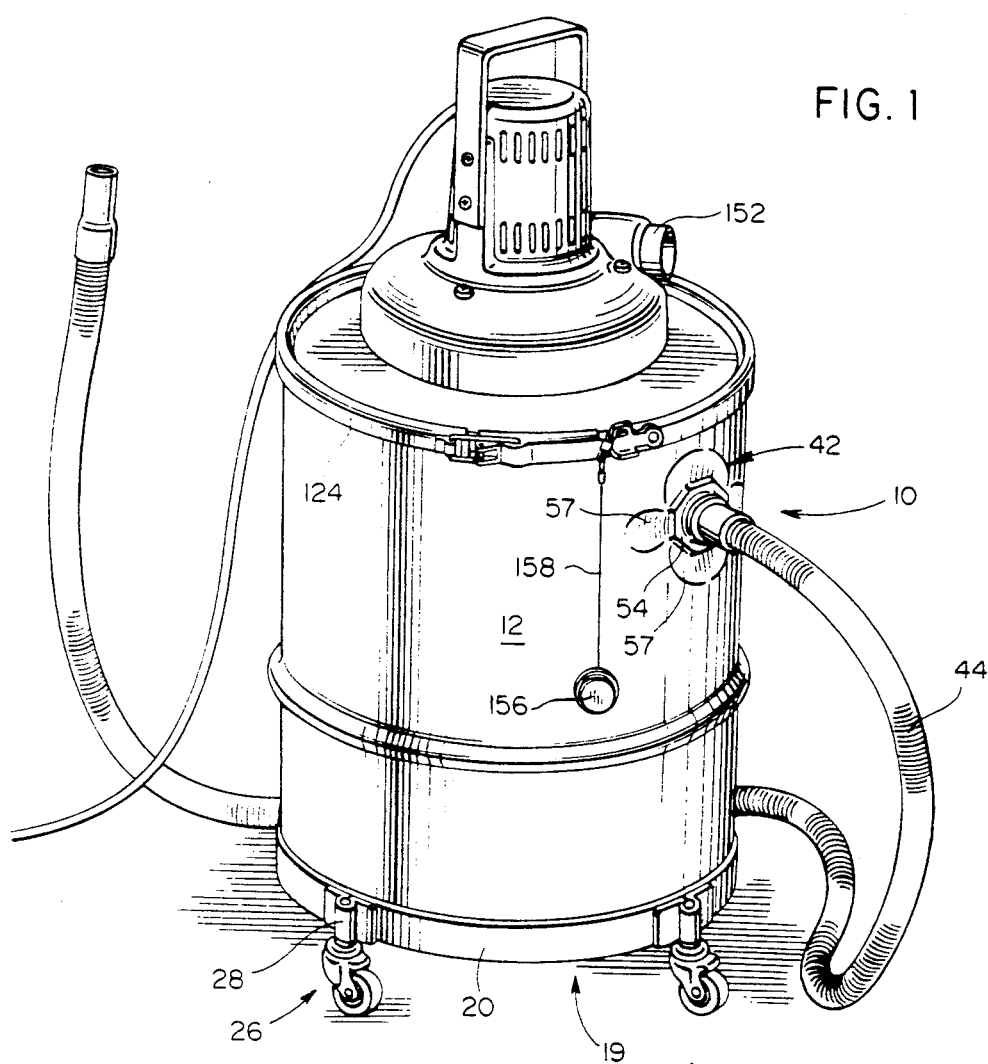
FIG. 1 illustrates a preferred disposable metal filtration canister with a vacuum motor assembly in accordance with the present invention.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 and 2, in particular, a disposable HEPA filtration device embodying the teachings of the subject invention is generally designated as 10. With reference to its orientation in FIG. 1, the disposable HEPA filtration device includes a cylindrical-shaped canister 12 having a capacity in the neighborhood of 5 to 55 gallons. The canister body shown in the drawings of FIGS. 1-8 is made of metal but can be made of any suitable material, such as plastic and the like. The canister 12 includes a bottom plate 14, secured to the cylindrical sidewall of the canister by welding or other means. An open end 16 of the canister is located opposite to the bottom 14. At the open end 16 of the canister is a curled lip 18 defining the uppermost portion of the canister 12.

The canister is preferably equipped with a removable caster assembly 19 which includes a ring 20 having radially inwardly projecting tabs 22 which support the lowermost edge 24 of the bottom plate 14 and sidewall of the canister. Several casters 26 are secured about the periphery of the ring 20 in a conventional manner and include hollow sleeves 28 within which is located a caster pin 30. The pin 30 cooperates with a caster wheel 32 which is mounted in a bracket 34. The bracket 34 is rotatable with respect to the pin 30 by ball bearings 36 which are interposed between the caster bracket and a plate 38 fitted on pin 30. Another plate (not shown) secured to the pin 30 is located below upper plate 40 of the bracket 34. The ring 20 has a diameter designed to snugly fit around the bottom of the canister sidewall as shown in FIG. 2. Thus, the caster assembly 19 allows the canister and vacuum motor assembly to be movable, but the caster assembly can be easily removed when the canister is ready for disposal.

In the sidewall of the canister is located an inlet generally designated as 42 through which a disposable vacuum hose 44 is insertable. The inlet shown is a bung-type inlet and closure formed by a standard Tri-Sure steel inlet fitting 53 with a steel plug 156. Preferably, the inlet is a two-inch flanged opening mated with a two-inch bung closure fitting. This fitting includes octagonally-shaped metal nut portion 54 with threaded nipple portion 55 formed as a single piece. The inlet fitting is press fitted into the flanged opening in a conventional manner with inturned lip 59 curving around the external end of nipple portion 55 to assist in holding the fitting in place.

The vacuum hose 44 includes a coupling 46 including cylindrical section 50. The diameter of coupling section 50 is sized to be substantially equal to the internal diameter of internally threaded portion 52 of the nipple 55. When coupling section 46 is inserted in inlet 42, the coupling section does not extend into the interior of the canister 12.

The inlet fitting 53 is made of a magnet attracting material, preferably high grade steel. The internal surface 56 of steel nut portion 54 is smooth and flat. When coupling section 46 is inserted in inlet 42, the coupling section only extends to the internal surface 56. Further, since the inside surface of the nut portion 54 is flat and the inside surface of the metal canister wall is cylindrical, there is some minor flattening of the wall surface when the inlet fitting is press fitted into the flanged opening, as shown at 57.

It is essential in the form of the invention shown that the internal surface of the canister surrounding the opening 42 be flat and made of steel or other magnetically attracting material. Hence, if the canister body is made of plastic, the inlet opening 42 must be fitted with a steel fitting or other type fitting which provides a magnetically attracting flat internal surface. Alternately, a plastic fitting could be used if a flat steel ring, or ring of a similarly attracting material, is glued to the internal surface of the plastic fitting to provide the necessary flat, magnetically attracting surrounding surface.

As shown in solid lines in FIG. 2 and in both dotted and solid lines in FIG. 4, a sealing flap 58 includes a magnet 66 which can be formed in the shape of a circle. The magnet 66 is mounted on and 64 of a strip 60 made of a flexible material such as plastic tape or other flexible material. The other end 62 of the strip 60 is secured to the inner surface of the canister and can extend to and around the sealing lip 18 (as shown in FIGS. 2 and 4). The strip 60 positions the magnet 66 so as to abut metal nut portion 54 to thereby close off inlet opening 42 and at the same time swing away when sufficient suction is applied. The initiation of a suction force on the canister must be sufficient to overcome the magnetic attraction of the magnet 66 to the metal nut portion 54.

As shown in FIG. 2, with the cylindrical section 50 of coupling 46 in position in the inlet 42, the vacuuming of harmful contaminants can be initiated. With the coupling 46 inserted into the inlet 42, contaminated air drawn into the canister in the direction of arrows 70, is drawn in the direction of HEPA filtration mechanism 72.

However, when the suction force on vacuum hose 44 and coupling 46 is terminated, the weight of the magnet 66 causes it to swing into a closing position in the direction of arrows 68 and toward contact with the nut 54. The magnetic attraction of the magnet 66 towards the internal surface 56 of nut portion 54 and the sidewall of the canister, if metal, then causes the magnet 66 to be rapidly and immediately sealed against the internal surface 56 of the nut 54 as shown in solid lines in FIG. 4, thus unexpectedly sealing the inlet 42 tightly and completely.

If for any reason the coupling 46 were to be removed from the inlet 42 while a suction force is acting on the inlet, air would continue to be drawn into the inlet 42 and prevent outward escape of contaminants from the canister through the inlet. Upon termination of the suction force, the magnet 66 automatically and immediately covers and seals the inlet.

Figure 9:
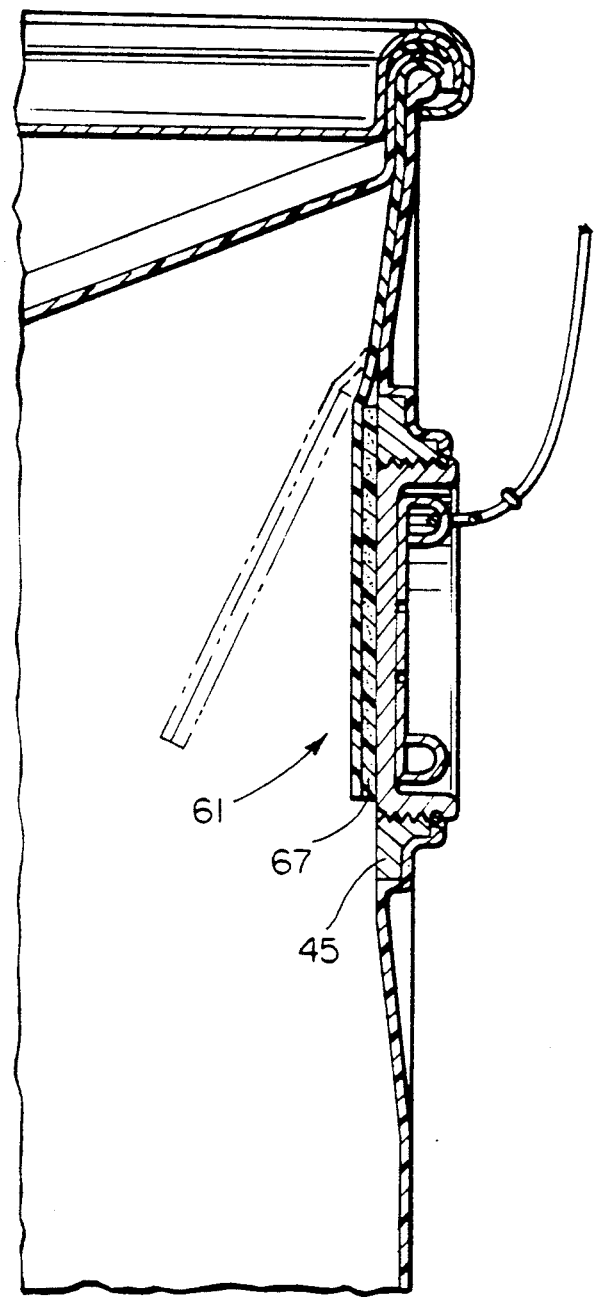
FIG. 9 shows a sectional view of an alternate canister inlet, similar to FIG. 4, but the canister body is made of a suitable plastic material and the inlet made of metal to cooperate with the magnetic flap seal.

In FIG. 9, flap 61 is provided with magnet 67. The canister body is made of plastic and other suitable material. Inlet opening 42 is appropriately fitted with an internally threaded steel inlet fitting 45 which provides a flat internal surface for abutment with magnet 67. Inlet fitting 45 is mounted in the side wall of the canister by any suitable mechanism such as adhesive or the like.

The preferred material for the magnet 66 is varium ferride rubber coated sheeting or other suitable flexible magnet material. The preferred thickness is about $\frac{1}{8}$", but other thicknesses can be used. Also, other solid magnetic plate-like components can be used which will provide tight and complete sealing with a flat magnetically attracting ring mounted on the canister wall around the inlet opening. When the preferred magnet material is used in conjunction with a steel inlet fitting, it is surprisingly found that the magnet provides a complete and tight sealing of the inlet opening immediately upon loss of suction within the canister. This unexpectedly complete and tight sealing of the inlet opening by a magnetically biased flap mechanism is an important feature of the present invention. Further, it is believed that the magnet piece and magnetically attracting piece can be reversed without detracting from the present invention.

The HEPA filtration mechanism 72 is mounted to the underside of a support plate 74. The support plate includes a curved rim 76 shaped to fit over the curled lip 18 of the canister 12. Extending downwardly from the curved rim 76 is a peripheral flange 78 which interconnects the curved rim 76 with a conically-shaped pan 80 having radially extending strengthening ribs 82 (see FIG. 7). The ribs 82 and the conically-shaped pan 80 terminate at an annular plate 84 having a central opening 86 serving as an exhaust port or outlet. The support plate 74 is preferably made from molded plastic.

The peripheral flange 78 tapers inwardly at a slight angle, preferably three to five degrees. When the HEPA filtration mechanism 72 is placed into the canister by positioning the support plate over the opening of the canister 12, there is a resistive force against the support plate 74 as the flange 78 contacts the curled lip 18 and the upper edge of the sidewall. Continued downward movement of the support plate 74 into the canister 12 causes a snug fit of the support plate in the canister top as the curved rim 76 is moved to rest on top of the curled lip 18. Adhesive is applied to the underneath side of rim 76 for adhering the support plate 74 in position on top of lip 18. Once the support plate is adhered in position, air entering the canister through the inlet 42 and moving in the direction of arrows 70 must pass through the HEPA filtration mechanism 72 prior to exiting the canister 12 through the opening 86 of the support plate.

For the air to pass through the opening 86, the air initially passes through an annular-shaped prefilter 88. The prefilter is one-half to one inch thick. An upper edge 90 of the prefilter contacts the underside of an annular plate 98 whereas a lower portion 92 of the prefilter contacts a circular, solid support plate 94. The plate 94 can be made of rigid plastic or the like.

Spaced radially inwardly from the prefilter 88 is an annular HEPA filter 96. HEPA filter 96 has an outer diameter of approximately six inches and an inner diameter of approximately two and one-half inches. HEPA filter 96 is made of accordion-folded pleats as shown in FIG. 3 and is secured by an adhesive at its upper end to the annular plate 98 and at its lower end secured by an adhesive to the support plate 94. The adhesive fills any gaps between the HEPA filter and the plates 98 and 94. Therefore, any air reaching to the interior 100 of the HEPA filter must first pass through the HEPA filter.

Located within the interior 100 of the HEPA filter 96 is a cylindrical plastic support cage 102 formed in a grid pattern which serves to reinforce the HEPA filter. Similar to the HEPA filter 96, the cage 102 has its upper end secured to the annular plate 98 and its lower end secured to support plate 94. The annular plate 98 is secured to the underside of the annular plate 84 so that a downwardly depending flange 104 of the support plate 74 extends into the central opening 100 of the HEPA filter 96.

Secured at an intersection of the annular plate 98, and the bottom of the annular plate 84, is an upper edge 106 of a deflection plate 108. The deflection plate preferably tapers outwardly from its upper edge 106 to a lower edge 110, at which point, spaced approximately one-half inch from the prefilter 88, an extension portion 112 extends horizontally and is secured to the underside of the support plate 94.

As shown in FIG. 2, air entering the canister through coupling 46 initially encounters deflection plate 108. The deflection plate causes contaminated air to move downwardly towards the bottom 14 of the canister 12. Large, heavier particles of contaminants settle to the bottom of the canister. Finer, lighter particles of contaminants entrapped in the canister, under a suction force, are then forced to pass through the prefilter and then, if necessary, the HEPA filter prior to allowing filtered air to exit through the opening 86 of the support plate 74. As shown by arrows 114, the air passing deflector plate 108 may circle around behind the deflector plate to enter the prefilter 88.

To draw air in through the inlet 42, a vacuum motor assembly 116 is, preferably, removably mounted on top of canister 12. The vacuum motor assembly includes a support plate 118 with a U-shaped peripheral flange 120 which fits over the curved rim 76 of the support plate 74 and the sealing lip 18 of the canister 12. A gasket 122 is secured to the underside of the support plate 118 and is interposed between the underside of the U-shaped peripheral flange 120 and the curved rim 76.

To secure the vacuum motor assembly to the top of the canister 12 an expandable ring assembly 124 is clamped around the U-shaped peripheral flange 120 as shown in FIGS. 1 and 2. In FIG. 5, the expandable ring assembly 124 is shown in an expanded condition so that ring 125 may fit around the upper end of the canister 12. By movement of the lever 126 about pivot pin 128, end 130 of the ring 125 is drawn towards opposed end 132. After the lever 126 is moved into contact with the ring 125, a latch 134 is pivoted about pin 136 to overlie lever 126 and retain lever 126 pressed against the periphery of the ring 125.

The latch 134 includes an opening 138 which aligns with an opening 140 in lever 126 such that when the latch 134 retains the lever against the periphery of the ring 125, the openings 138 and 140 are aligned. A lock or other securing means may be passed through the aligned openings 138, 140 to secure the position of the expandable ring assembly 124.

As shown in FIG. 2, the vacuum motor assembly 116 includes a motor housing 142 to which is secured a handle 144. An electrical power source cord 146 is connected between a motor in the motor housing and a source of electric power (not shown) for energizing the motor of the vacuum motor assembly. Upon energizing of the vacuum motor, contaminated air is sucked into disposable vacuum hose 44 and drawn into canister 12 through the inlet 42. After the contaminated air is filtered through the HEPA filtration mechanism, the filtered air passes through the opening 86 of the support plate 74 in the direction of arrows 148. The filtered air is then moved in the direction of arrows 150 shown in FIG. 6, to move through an outlet pipe 152 of the vacuum motor assembly and to the surrounding atmosphere.

After a predetermined amount of use, the canister 12 is made ready for disposal. First, it is preferable to remove hose coupling 46 from the inlet opening 42 and screw the closure plug 156 of the bung-type fitting into threaded portion 55 until engaging with magnet 66. Thus, as a security measure, opening 42 is mechanically sealed from the outside by plug 156, as well as from the inside by magnet 66. A cable 158 or other connecting means is provided to secure the sealing plug 156 to the ring assembly during operation so as to avoid losing the plug before final closure.

Figure 8:
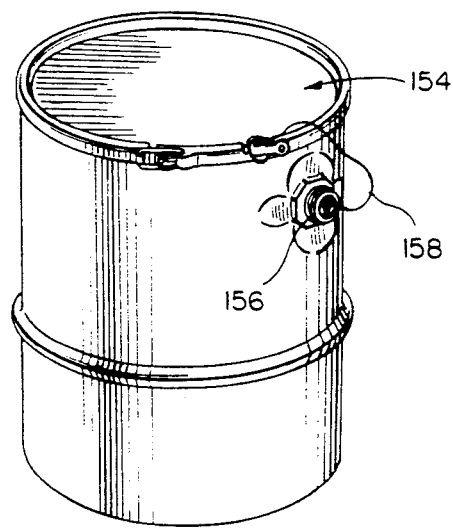
FIG. 8 illustrates the filtration canister with sealing plate for sealing the exhaust port of the support plate and a sealing cap for sealing the inlet in place for disposal of the filtration canister.
Figure 6:
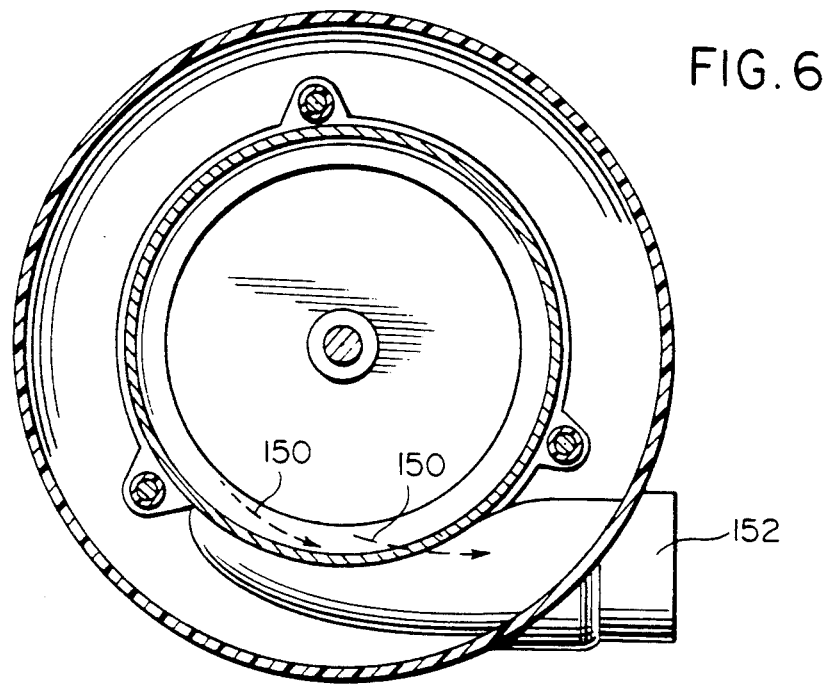
FIG. 6 is a sectional view taken along line 6—6 of FIG. 2.
Figure 7:
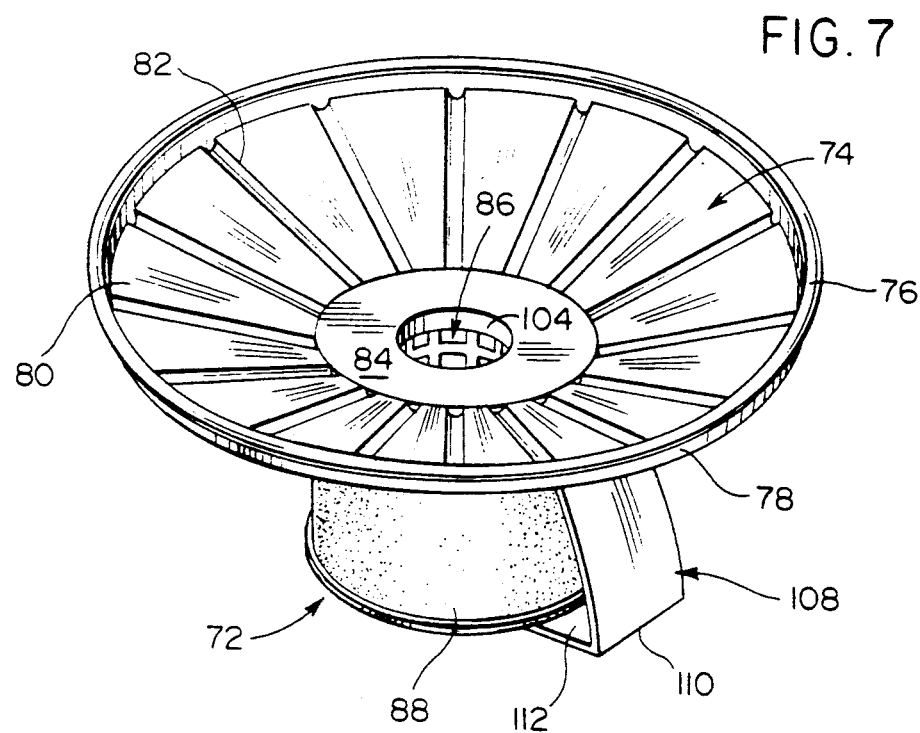
FIG. 7 illustrates a support plate and HEPA filtration mechanism in accordance with the present invention.

Then, the expandable ring assembly 124 is moved to the position shown in FIG. 5, and cable 158 disconnected from plug 156. The ring assembly is removed from the canister and the vacuum motor assembly 116 is lifted off from the top of the canister by handle 144. Sealing lid 154 as shown in FIG. 8 is then placed on top of the open end of the canister 12 to cover the support plate 74. The sealing lid 154 includes a U-shaped peripheral flange shaped similar to the flange 120 of the support plate 118 which fits over the curled lip 18 of the canister and the curved rim 76 of the support plate 74, as did the flange 120 of the support plate 118.

During the time period between removal of the vacuum motor assembly and fitting of the sealing lid, there is no danger of escape of contaminants from the canister. During the changeover process, the support plate 74 retains its sealed fit in the canister and cap 156 remains in place. The only exposed area of the canister is the central opening 86 of the support plate 74. However, the central opening 86 only exposes the radially innermost surface of HEPA filter 96 from which only filtered air can pass. Therefore, there is no danger of exposure of the harmful contaminants inside the canister to the operator.

Once the sealing lid is in place, the expandable ring assembly 124 is refitted over the upper end of the canister and moved into the locked position as is shown in FIG. 8. The openings 138, 140 are thereby aligned for fitting a lock through the openings to prevent opening of the expandable ring assembly 124.

With the sealing lid 154 and the sealing cap 156 in place, and the caster assembly 19 removed, the entire canister 12 including the HEPA filtration mechanism 72 is available for disposal. The canister as shown in FIG. 8 meets federal requirements for disposal as hazardous material, once appropriately packaged and labeled.

If infectious waste is contained in the canister, it may be necessary in order to meet disposal guidelines, to have a biocide material released within the canister, which may be actuated by an actuator button extending through the canister. These types of external actuation mechanisms are known and have been approved for decontaminating isolated biological material.

By the present invention, harmful contaminants may thereby be collected and disposed of without exposure to the operator. This system prevents escape of contaminants once brought within the confines of the canister 12. It is to be understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the full scope of the appended claims.

I claim:

1. A disposable filtration device for use in conjunction with a vacuum motor mechanism comprising:
    a canister having a sealed bottom and an open top,
    an inlet opening to the canister which includes a magnetically attracting flat inner surface adjacent the opening,
    a support plate spanning the open top of the canister, the support plate having an outlet for the canister,
    a HEPA filtration means located within the canister for filtering air entering the inlet opening prior to the air passing to the outlet, and
    magnetic sealing means for covering and sealing the inlet opening whenever suction from said vacuum motor mechanism is removed.

2. A disposable filtration device according to claim 1, wherein the inlet opening is formed in a sidewall of the canister.

3. A disposable filtration device according to claim, 2, wherein the magnetic sealing means includes a magnet sheet secured to a flexible strip, the strip having one end secured to the canister for movement of the strip away from and toward the inlet opening.

4. A disposable filtration device according to claim 1, further comprising a sealing lid removably mounted on top of the canister.

5. A disposable filtration device according to claim 1, wherein the HEPA filtration means is secured to the support plate and includes an annular filter surrounding the outlet of the metal canister so that only filtered air passes to the outlet after entering the canister through the inlet.

6. A disposable filtration device according to claim 5, wherein the HEPA filtration means includes a HEPA filter and a prefilter.

7. A disposable filtration device according to claim 1, wherein said vacuum motor assembly is removably mounted on top of the canister.

8. A disposable filtration device according to claim 7, wherein a securing assembly alternately secures the vacuum motor assembly and the sealing lid to the canister.

9. A disposable filtration device according to claim 1, further comprising a vacuum hose having a coupling with a diameter substantially equal to a diameter of the inlet for positioning of the coupling in the inlet.

10. A disposable filtration device according to claim 9, wherein the inlet is internally threaded.

11. A disposable filtration device according to claim 10, further comprising a sealing cap having external threads for engaging the internal threads of the inlet so as to close the inlet for disposal of the canister.

12. A disposable filtration device for collecting harmful contaminants and retaining the contaminants inside the device during disposal of the device, the disposable filtration device comprising:
    a canister made of metal and having a sealed bottom and an open top,
    an inlet formed in a sidewall of the canister,
    a support plate sealing the open top of the canister, the support plate having an outlet for the canister,
    a HEPA filtration means secured to the support plate so that all air entering the inlet only passes to the outlet after passing through the HEPA filtration mechanism, and
    magnetic sealing means contacting the canister and covering the inlet to completely seal the inlet, except when a force moves the magnetic sealing means away from the inlet.

13. A disposable filtration device according to claim 12, wherein the HEPA filtration means includes a deflection plate located opposed to the inlet.

14. A disposable filtration device according to claim 12, wherein the magnetic sealing means includes a magnet secured to a strip, the strip having one end secured to the canister for pivotal movement of the strip.

15. A disposable filtration device according to claim 13, wherein the HEPA filtration means includes an annular HEPA filter surrounding the outlet.

16. A disposable filtration device according to claim 12, further comprising a vacuum motor assembly removably mounted on top of the canister and a sealing lid alternately mounted on top of the canister when the vacuum motor assembly is not present.

17. A disposable filtration device according to claim 16, wherein a securing assembly alternately secures the vacuum motor assembly and the sealing lid to the canister.

18. A disposable filtration device according to claim 12, wherein the support plate tapers downwardly from the top of the canister towards the outlet.

19. A disposable filtration device according to claim 12, wherein a peripheral flange of the support plate tapers inwardly to force fit the support plate in the top of the canister.

20. A disposable filtration device for collecting lead contaminated particulate and retaining the lead contaminated particulate inside the device during collection of the lead contaminated particulate and disposal of the device, the disposable filtration device comprising:
    a canister having a sealed bottom and an open top,
    an inlet formed in a sidewall of the canister,
    a support plate means sealing the open top of the canister, the support plate having an outlet for the canister,
    a HEPA filtration means secured to the support plate so that all air entering the inlet only passes to the outlet after passing through the HEPA filtration mechanism, and
    sealing means contacting the canister and covering the inlet to seal the inlet under magnetic force except when sufficient force moves the sealing means away from the inlet.

21. A disposable filtration device according to claim 20, wherein the HEPA filtration mechanism includes a deflection plate located opposed to the inlet.

22. A disposable filtration device according to claim 20, wherein the magnetic sealing means includes a magnet secured to a strip, the strip having one end secured to the canister for pivotal movement of the strip.

23. A disposable filtration device according to claim 22, wherein the HEPA filtration means includes an annular HEPA filter surrounding the outlet.

24. A disposable filtration device according to claim 20, further comprising a vacuum motor assembly removably mounted on top of the canister and a sealing lid alternately mounted on top of the canister when the vacuum motor assembly is not present.

25. A disposable filtration device according to claim 24, wherein a securing assembly alternately secures the vacuum motor assembly and the sealing lid to the canister.

26. A disposable filtration device according to claim 20, wherein the support plate means tapers downwardly from the top of the canister towards the outlet.

27. A disposable filtration device according to claim 20, wherein a peripheral flange of the support plate means tapers inwardly to force fit the support plate in the top of the canister.

28. A vacuum device for collecting hazardous particulate capable of generating substantial airborne contaminants upon being disturbed, which comprises:
    a disposable canister having an inlet opening and a top with an outlet opening,
    a HEPA filtration means positioned in advance of the outlet opening so that all air entering the inlet opening must pass through the HEPA filter means before exiting the outlet opening,
    a suction hose associated with said inlet opening,
    a vacuum motor means secured to the canister to create suction in the canister and the suction hose to vacuum contaminated air and hazardous particulate into the canister through the inlet and decontaminated air out of the canister after passing through the HEPA filter means, and sealing means for completely and automatically sealing the inlet opening under magnetic force whenever the vacuum motor means was off.

29. A vacuum device for collecting hazardous particulate according to claim 28, wherein the hazardous particulate is asbestos.

30. A vacuum device for collecting hazardous particulate according to claim 28, wherein the hazardous particulate is lead.

31. A vacuum device for collecting hazardous particulate according to claim 28, wherein the hazardous particulate is bacteriological material.

32. A vacuum device for collecting hazardous particulate according to claim 28, wherein said inlet opening is metal and said sealing means is a magnetic sealing means.

33. A vacuum device for collecting hazardous particulate according to claim 28, wherein said canister if metal.

34. A vacuum device for collecting hazardous particulate according to claim 28, wherein said canister is plastic.

35. A vacuum device for collecting hazardous particulate according to claim 32, wherein said canister is plastic.

* * * * *